(12) United States Patent
Balasubramanian et al.

(10) Patent No.: US 9,588,969 B2
(45) Date of Patent: Mar. 7, 2017

(54) RETARGETING CONTENT SEGMENTS TO MULTIPLE DEVICES

(71) Applicant: International Business Machines Corporation, Armonk, NY (US)

(72) Inventors: Swaminathan Balasubramanian, Troy, MI (US); Ravi P. Bansal, Tampa, FL (US); Brian M. O'Connell, Cary, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 14/281,553

(22) Filed: May 19, 2014

(65) Prior Publication Data

US 2015/0331874 A1 Nov. 19, 2015

(51) Int. Cl.
*G06F 17/30* (2006.01)
(52) U.S. Cl.
CPC ........ *G06F 17/30* (2013.01); *G06F 17/30079* (2013.01); *G06F 17/3089* (2013.01); *G06F 17/30112* (2013.01); *G06F 17/30194* (2013.01)
(58) Field of Classification Search
CPC ............... G06F 17/30074; G06F 17/30112
USPC ................................ 707/756, 758
See application file for complete search history.

(56) References Cited

U.S. PATENT DOCUMENTS

| | | | |
|---|---|---|---|
| 6,085,229 A | 7/2000 | Newman et al. | |
| 7,210,100 B2 | 4/2007 | Berger et al. | |
| 7,613,810 B2 | 11/2009 | Romero et al. | |
| 7,739,658 B2 | 6/2010 | Watson et al. | |
| 7,827,314 B2 | 11/2010 | Gibbs et al. | |
| 7,853,939 B2 | 12/2010 | Kato et al. | |
| 8,103,552 B2 | 1/2012 | Janakiraman et al. | |
| 8,181,107 B2 | 5/2012 | Melnyk et al. | |
| 2003/0149581 A1* | 8/2003 | Chaudhri et al. | 705/1 |
| 2004/0049574 A1* | 3/2004 | Watson et al. | 709/224 |
| 2007/0143377 A1 | 6/2007 | Waites | |
| 2008/0147821 A1* | 6/2008 | Dietrich et al. | 709/216 |
| 2011/0116540 A1 | 5/2011 | O'Connor et al. | |
| 2012/0240177 A1 | 9/2012 | Rose | |

OTHER PUBLICATIONS

D. Schwabe et al., Cohesive design of personalized Web applications, 2002, vol. 6, 34-43.*
Ankolekar et al., "Kalpana—Enabling Client-side Web Personalization", pp. 21-25, HT'08, Jun. 19-21, 2008, Pittsburgh, Pennsylvania, USA, Copyright 2008 ACM, 978-1-59593-985—Feb. 8, 2006, All pages.

(Continued)

*Primary Examiner* — Jean B Fleurantin
(74) *Attorney, Agent, or Firm* — Maeve Carpenter

(57) ABSTRACT

A tool for retargeting content from a web page to one or more devices. The tool issues, by one or more computer processors, a request to configure preferences for retargeting content from the web page. The tool receives, by one or more computer processors, a file from a first device. The tool determines, by one or more computer processors, at least one characteristic of the file. The tool matches, by one or more computer processors, the at least one characteristic of the file to an additional device. The tool outputs, by one or more computer processors, the file to the additional device.

18 Claims, 3 Drawing Sheets

(56) References Cited

OTHER PUBLICATIONS

Kumar et al., "Automatic Retargeting of Web Page Content", Copyright is held by the author/owner(s), CHI 2009, Apr. 4-9, 2009, Boston, Massachusetts, USA, ACM 978-1-60558-247—Apr. 9, 2004, All pages.
Lee, "Deploying personalized mobile services in an agent-based environment", Department of Information Management, National Sun Yat-Sen University, 70 Lien-hai Road, Kaohsiung 804, Taiwan, ScienceDirect, Expert Systems with Applications 32 (2007) 1194-1207, © 2006 Elsevier Ltd, doi:10.1016/j.eswa.2006.02.009, All pages.
"DLNA Device Classes—Digital Media Server", Copyright © 2013, Digital Living Alliance, All Rights Reserved, <http://web.archive.org/web/*/http://www.dlna.org/dlna-for-industry/digital-living/how-it-works/dlna-device-classes/digital-media-server>, All pages.

* cited by examiner

RETARGETING CONTENT SEGMENTS TO MULTIPLE DEVICES

FIELD OF THE INVENTION

The present invention relates generally to the field of web applications, and more particularly to retargeting specific content to multiple devices.

BACKGROUND OF THE INVENTION

Many client-side web browser technologies upload and download new data from the web server without undergoing a full page reload. To allow a user to continue to interact with the page, communications, such as data requests going to the server, are separated from data coming back to the page. Otherwise, the user would have to routinely wait for the data to come back before the user can do anything else on the page, just as a user has to wait for a page to complete the reload. This increases the overall performance of the site, as sending a request can complete more quickly, independent of blocking and queuing required to send data back to the user. For example, data fetched by an Ajax request is typically formatted in XML language or JavaScript® Object Notification (JSON) format. Since both of these formats are natively understood by JavaScript®, a programmer can easily use them to transmit structured data in their web application. When this data is received via Ajax, the JavaScript® program then uses the Document Object Model (DOM) to dynamically update the web page based on the new data, allowing for a rapid and interactive user experience. In short, using these techniques, web designers can make their pages function like desktop applications. For example, Google Docs® uses this technique to create a web based word processor.

Content augmentation is the process by which content is modified either through the addition, deletion, or change of parts of the content. For example, augmented reality is a form of content augmentation where additional information is presented on top of a visual representation of the surrounding environment.

SUMMARY

Aspects of an embodiment of the present invention disclose a method, system, and computer program product for retargeting content from a web page to one or more devices. The method includes issuing, by one or more computer processors, a request to configure preferences for retargeting content from the web page. The method includes receiving, by one or more computer processors, a file from a first device. The method includes determining, by one or more computer processors, at least one characteristic of the file. The method includes matching, by one or more computer processors, the at least one characteristic of the file to an additional device. The method includes outputting, by one or more computer processors, the file to the additional device.

DETAILED DESCRIPTION

Figure 1:
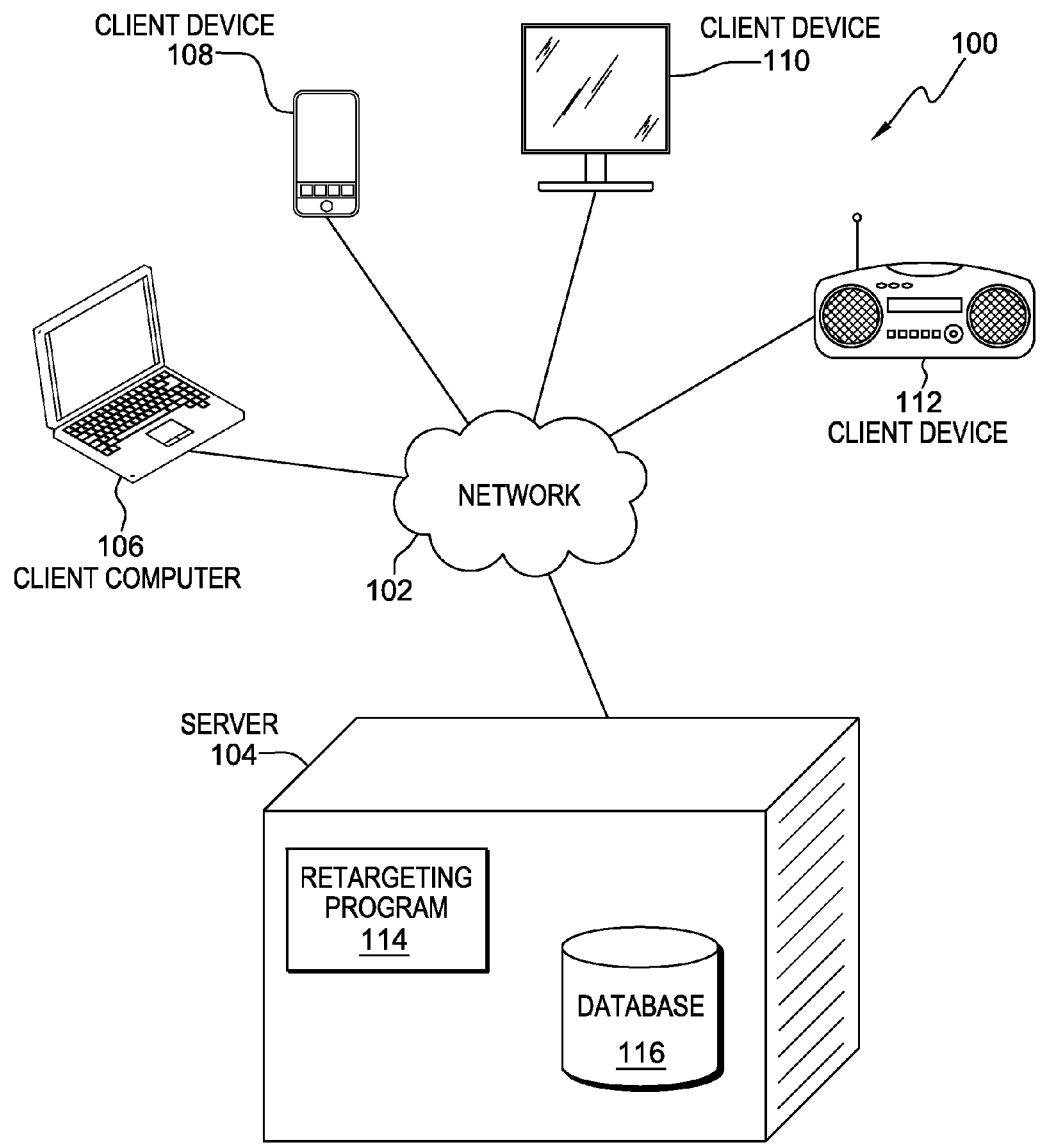
FIG. 1 is a functional block diagram illustrating a data processing environment, generally designated 100, in accordance with an embodiment of the present invention.

Embodiments of the present invention recognize that presently a user or a program may not retarget content from a website to one or more devices.

Embodiments of the present invention provide the capability for a user or a program to retarget content from a website by specifying one or more segments of the content to be viewed on one or more devices. Embodiments of the present invention provide the capability to apply specific device augmentations to the one or more segments rendered on target devices.

Implementation of such embodiments may take a variety of forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or an external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to figures. FIG. 1 illustrates a data processing environment, generally designated 100, including a network 102, a server 104, a client computer 106, and multiple client devices, such as client device 108, 110, and 112, in accordance with an embodiment of the present invention.

In the exemplary embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104 and client computer 106 are interconnected by network 102. Network 102 can be any combination of connections and protocols capable of supporting communications between server 104, client computer 106, client devices 108, 110, 112, and retargeting program 114. Network 102 may also be implemented as a number of different types of networks, such as an intranet, a local area network (LAN), a virtual local area network (VLAN), or a wide area network (WAN). FIG. 1 is intended as an example, and not as an architectural limitation for the different embodiments.

In the exemplary embodiment, server 104 may be, for example, a server computer system such as a management server, web server, or any other electronic device or computing system capable of sending and receiving data. In another embodiment, server 104 may be a data center, consisting of a collection of networks and servers providing an IT service, such as virtual servers and applications deployed on virtual servers, to an external party. In another embodiment, server 104 represents a "cloud" of computers interconnected by one or more networks, where cloud service provider 104 is a computing system utilizing clustered computers and components to act as a single pool of seamless resources when accessed through network 102. This is a common implementation for data centers in addition to cloud computing applications.

In the exemplary embodiment, server 104 includes a retargeting program 114 and a database 116. In the exemplary embodiment, retargeting program 114 is a program that provides the capability to receive content from a web page, provided by a web server (not shown) connected to server 104 via network 102, detect specific characteristics of the content, which is typically organized into one or more segments (i.e., files) with each segment containing information with one or more specific characteristics, and output the content, based, at least in part on, the specific characteristics of the one or more segments, to one or more client devices, such as client computer 106 and client device 108, 110, and 112, that are optimized to handle the content. For example, a 1080p high definition television may be optimized to handle a high resolution video file better than a standard definition computer monitor. In the exemplary embodiment, retargeting program 114 operates on a central server, such as server 104, and can be utilized by one or more client devices. In another embodiment, retargeting program 114 may be a software-based program, downloaded from a central server, and installed on one or more client devices such as client computer 106 and client device 108, 110, and 112. In another embodiment, retargeting program 114 may be utilized as a software service. In this case, clients of the software service may be both a web content provider and an end user. For example, a web content provider may request user preferences from the service, enabling the user to set their preferences once, and have the content type delivered to a preferred device without having to select user preferences on every web page they access.

In the exemplary embodiment, database 116 is a database for storing information related to one or more devices, such as client computer 106 and client device 108, 110, and 112. In the exemplary embodiment, database 116 maintains information including, but not limited to, configurable preferences, a table of devices, including a plurality of devices and one or more characteristics associated with each device in the plurality of devices, default preference settings, and environmental factors (i.e., proximity of additional devices to a first device, user usage patterns, etc.).

In the exemplary embodiment, client computer 106 and client device 108, 110, and 112 are clients to server 104, and may be, for example, a desktop computer, a laptop computer, a tablet computer, a personal digital assistant (PDA), a smart phone, a thin client, or any other electronic device or computing system capable of communicating with server 104 through network 102. In another embodiment, client device 108, 110, and 112 may be clients to client computer 106, such as a multimedia device including a display, a tablet, a set-top box, a digital video recorder (DVR), a cable receiver, a stereo receiver, a speaker system, a printer, a Braille device, or any other device capable of sending and receiving data. Client devices 108, 110, and 112 may be in proximity with client computer 106, as defined by a Bluetooth connection, a Wi-Fi connection, a global positioning system, or any other suitable means of determining location. In the exemplary embodiment, client computer 106 includes a processor (not shown) and one or more data storage devices (not shown). The processor can be any custom made or commercially available processor, a central processing unit (CPU), an auxiliary processor among several processors associated with the computer, a semiconductor based microprocessor, a macro processor, or generally any device capable of executing instructions. The one or more data storage devices can be at least one of the random access memory (RAM), read only memory (ROM), a cache, a stack, or the like that can temporarily or permanently store electronic data. In the exemplary embodiment, client computer 106 includes an internet browsing program (not shown) for communicating securely with server 104, and provides respective user interfaces for viewing and communicating with server 104 via a web page, web portal, etc. In the exemplary embodiment, client computer 106 is capable of communicating with client device 108, 110, and 112 through network 102.

Data processing environment 100 may include additional cloud service providers, third party cloud service providers, cloud service consumers, displays, and other devices not shown.

Server 104 and client computer 106 each maintain respective internal components, and respective external components. In general, server 104 and client computer 106 can be any programmable electronic device as described in further detail with respect to FIG. 3.

Figure 2:
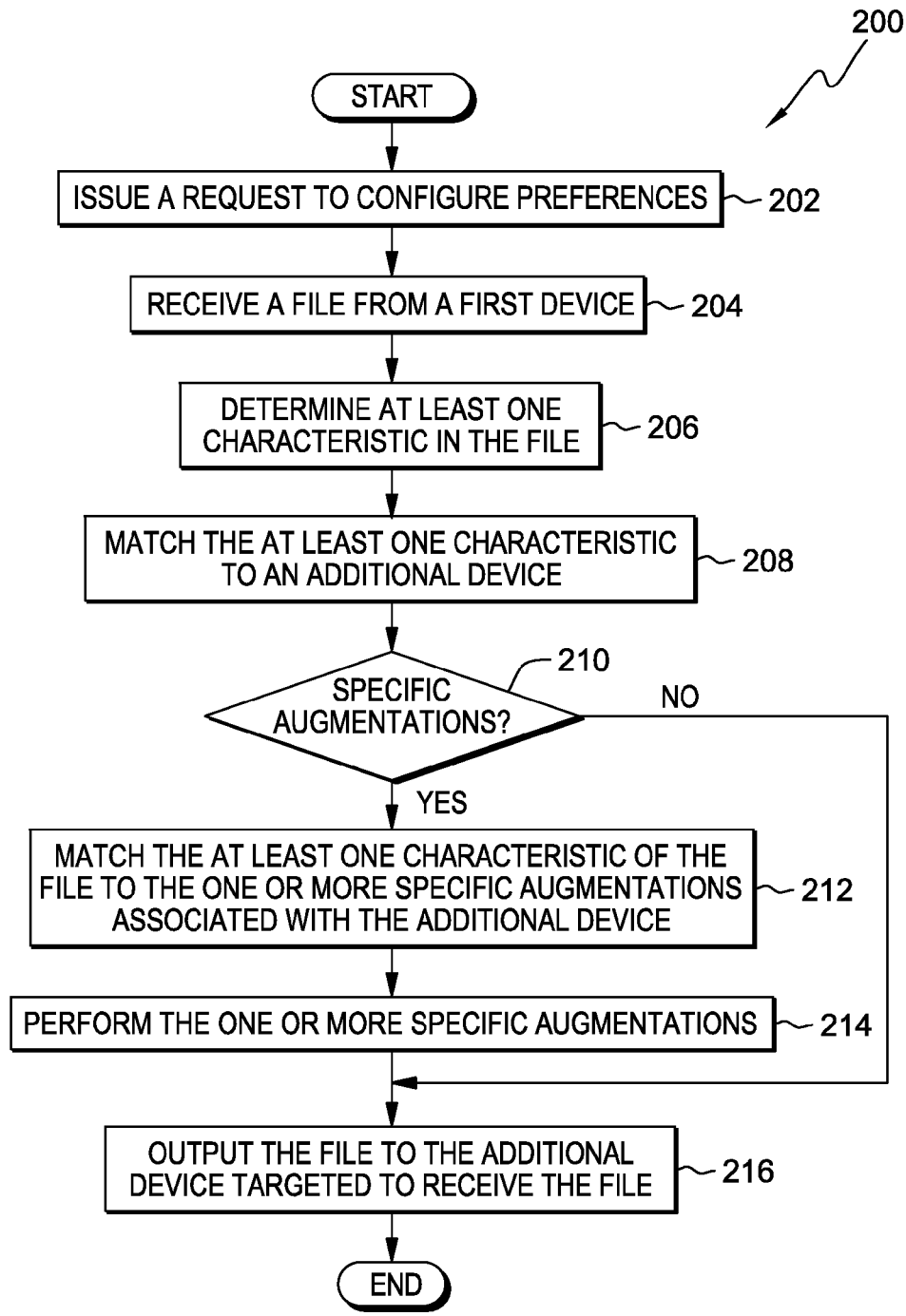
FIG. 2 is a flowchart of an exemplary process flow, generally designated 200, for retargeting content from a website to one or more devices, in accordance with an embodiment of the present invention.

FIG. 2 is a flowchart depicting the steps of retargeting program 114 for retargeting content from a website to one or more devices, in accordance with an embodiment of the present invention.

Retargeting program 114 issues a request to configure preferences for retargeting content from a web page (step 202). In the exemplary embodiment, retargeting program 114 receives a request to configure preferences for retargeting content from a web page, wherein retargeting content includes, but not limited to, routing segments of the content of a web page to one or more devices in addition to, or in place of, a first device. In the exemplary embodiment, a user or a program configures preferences by associating one or more characteristics to a file (i.e., a segment of the content from the web page), and defining a device to receive the file. The user or program associates the one or more characteristics to the file to identify the type of content provided by the file. The user or program designates a device as a preferred device for handling certain file types found in the plurality of content provided in a server response to a web page request. For example, Facebook® contains a plurality of content, such as contacts, events, photo streams, embedded video, and posts. A user or a program can configure preferences to govern how the plurality of content is handled across one or more devices, wherein contacts and events are viewed on a smart phone, photo streams and posts are viewed on a tablet, and embedded video is viewed on a television. In another embodiment, retargeting program 114 may impose default configurable preferences, based at least in part on, popular configurations and logical end results (i.e., play audio files on a stereo system, play video on a television, display text on a tablet, etc.).

When associating at least one characteristic to a file, the characteristic may include, for example, file type, file size, resolution, playback duration, bit rate, codec requirement digital rights management (DRM) requirement, user defined semantic tags, user defined query methods, user defined keywords, file location, and user defined rendering tags. For example, in some cases, a file may be associated with a characteristic such as the file's location on a web page. In other cases, for example, the user may associate one or more keywords to a web page as a whole or to parts of a webpage. In another embodiment, a program, instead of a user, may perform these definitions and associations by using current web page indexing and word correlation algorithms.

In the exemplary embodiment, defining a device to receive a file (i.e., targeting a device to receive a file) includes associating at least one of the characteristics previously associated to a file to the device. In the exemplary embodiment, associating at least one of the characteristics previously associated to a file to the device indicates that the device associated with a specific characteristic is a preferred device for handling the file having that specific characteristic. In the exemplary embodiment, a preferred device is a specific device optimized to handle a specific file type, as indicated by at least one characteristic associated to the specific file. For example, a specific device associated with a specific characteristic, such as an mp3 file type, indicates that the specific device is a preferred device for handling mp3 audio files, such as an mp3 player or other portable audio device. In another embodiment, defining a device to receive a file may include ranking the device in a ranked hierarchy among a plurality of devices, from a first preferred device to a last preferred device, such that, for example, if a first preferred device is unable to receive a file, a second preferred device receives the file, provided that both the first preferred device and the second preferred device share at least one characteristic in common with the file. In another embodiment, defining a device to receive a file may include applying environmental factors to establish a first preferred device. For example, while it may be preferable that a high bit rate audio file be output to a media receiver, if a user is located in an adjacent room according to location detection, sets a command, or a device state indicates that the user is engaged in an activity that makes the media receiver a poor choice for handling audio files, then the audio file can be output to a second preferred device that the user can hear, such as a smart phone or a sound system in the adjacent room.

In the exemplary embodiment, defining a device to receive a file can include, for example, associating one or more specific augmentations to the device, wherein the one or more specific augmentations may include augmenting information related to a file. A user can specify that an augmentation be performed on a file prior to being received by a preferred device previously associated with one or more specific augmentations. For example, where a user prefers to hear an audio podcast in Spanish, an audio file to be outputted to a preferred device, such as a sound system, can first be run through a translation program on a first device, or sent to a cloud service for translation prior to outputting to the preferred device. Similarly, web page text to be outputted to a preferred device, such as a tablet, can be augmented with keywords turned into hyperlinks to access additional information returned from a search engine. Finally, in reference to the Facebook® example, specific augmentations may include integrating Facebook® contacts with contacts on a smart phone, viewing events in the context of a calendar application on the smart phone, sharing photos in a tablet with other devices using a "tap to share" function, and automatically applying parental control settings for videos viewed on a television.

In the exemplary embodiment, retargeting program 114 catalogs a device associated with at least one of the characteristics previously associated to a file in a table of devices within a database, such as database 116. The table of devices includes a catalog of a plurality of devices targeted to receive the one or more files, along with the characteristics associated with the devices.

In another embodiment, defining a device to receive a file may include associating at least one of the characteristics previously associated to a file to a logical device (e.g., a browser, an application, etc.) on a device. For example, a web page heavily laden with JavaScript® opened in a first browser in the one or more devices may be retargeted to a second browser, specializing in fast JavaScript® processing, in the one or more devices.

Retargeting program 114 receives a file from a first device (step 204). In the exemplary embodiment, retargeting program 114 receives a file from a first device, such as client computer 106, wherein the file can include multiple segments of incoming content transferred to the first device from a server response, such as a response from server 104, to a browser request originating from the first device. For example, when a first device, such as client computer 106, initiates a browser request to download a YouTube® video, retargeting program 114 receives one or more files, such as a video file, an audio file, and a subtitle file.

Retargeting program 114 determines at least one characteristic in the file (step 206). In the exemplary embodiment, retargeting program 114 determines at least one characteristic in the file by decomposing a plurality of information contained in the file to isolate at least one characteristic in file. For example, in some cases, a web page may contain semantic tags associated with a file that identifies one or more characteristics of the information contained with the file. A program may detect a file's location on a web page by analyzing the position within the DOM. In the case where a file may be defined by a user or a program based on the file's location on a web page, the location can be reached and the characteristics detected using known query methods. In the case of files of embedded content (e.g., multimedia content), for example, at least one characteristic may be identified by locating specific rendering tags in combination with the file type or host, as is the case with YouTube® videos that may be located using an "iframe" tag in combination with "src" and "class" attributes of the tag.

Retargeting program 114 matches the at least one characteristic previously determined in the file to a device (step 208). In the exemplary embodiment, retargeting program 114 matches at least one characteristic previously determined in the file to a device in a table of devices by matching a characteristic associated with a device to at least one characteristic previously detected in the file. In the exemplary embodiment, retargeting program 114 searches the table of devices for all devices that share at least one characteristic in common with the characteristic previously determined in the file. For example, the first device, such as client computer 106, or an additional device, such as client device 108, 110, and 112 may share at least one characteristic in common with the characteristic previously determined in the file. When retargeting program 114 locates a device that shares at least one characteristic in common with the characteristics of the files, retargeting program 114 targets the device to receive the file. When retargeting program 114 locates multiple devices that share the at least one characteristic in common with the characteristics of the file, retargeting program 114 determines if there is a preferred device among the multiple devices, based, at least in part on, a configurable preferences, such as a ranked hierarchy or environmental factors. For example, if two devices, for example, a McIntosh® receiver and a basic wireless speaker, both share at least one characteristic in common with characteristics of an audio file, and a user has ranked the McIntosh® receiver higher than the basic wireless speaker, then retargeting program 114 may target the McIntosh® receiver to receive the audio file.

Retargeting program 114 determines if one or more specific augmentations are associated with the device targeted to receive the file (decision block 210). In the exemplary embodiment, retargeting program 114 determines if one or more specific augmentations are associated with the device by referencing the table of devices in database 116 to locate any specific augmentations associated with the device. For example, the device stored in the table of devices may include a specific augmentation associated with the device, along with instructions to perform the specific augmentation.

In response to retargeting program 114 determining that no specific augmentations are associated with the device to receive the file, retargeting program 114 proceeds to output the file to the device, such as client device 108, 110, and 112 (NO branch 210). For example, a user accessing their Facebook® page may want to send an event to their smart phone, as they want to be able to access the event information at a later time, for instance, to read directions en route to the event.

In response to retargeting program 114 determining that a specific augmentation is associated with the device to receive the file (YES branch 210), retargeting program 114 matches at least one characteristic of the file to the specific augmentation associated with the device (step 212). In the exemplary embodiment, the characteristic associated with the file can be used to automatically determine the augmentation content. In the exemplary embodiment, retargeting program 114 associates at least one of the characteristics previously associated to a file to the specific augmentation. In the case where at least one characteristic of the specific augmentation matches a characteristic of a file, the specific augmentation will be performed on that file. For example, when a file contains a list of contacts, friends, or buddies, a configurable preference may be to output the file to a smart phone. A specific augmentation for the file may include viewing contact phone numbers, addresses, etc. as defined in a local address book or contacts list on the smart phone. In another example, when a file contains an audio file and a text file having lyrics to a song on the audio file, a configurable preference may be to output the audio file to a tablet. A specific augmentation for the file may include overlaying the song lyrics on the right hand side of the screen while the song is playing, similarly to a karaoke machine displaying lyrics on a screen.

In response to matching at least one characteristic of the file to the one or more specific augmentations associated with the device, retargeting program 114 performs the one or more specific augmentations (step 214). In the exemplary embodiment, the one or more specific augmentations may be performed automatically. In another embodiment, a specific augmentation may be performed by prompting a user via a user interface, wherein the user selects a specific augmentation to perform from a list of a plurality of specific augmentations. In the exemplary embodiment, retargeting program 114 performs a specific augmentation based, at least in part on, instructions (i.e., executable code) associated with the specific augmentation.

Retargeting program 114 outputs the file to the device targeted to receive the file (step 216). In the exemplary embodiment, retargeting program 114 outputs the file to the device targeted to receive the file based, at least in part on, at least one characteristic shared between the file and the device. In the exemplary embodiment, retargeting program 114 removes the file sharing at least one characteristic with the device from the incoming content on the first device (i.e., the server response to the browser request), and outputs the file directly to the device targeted to receive the file. For example, if executable code is attached to a segment, retargeting program 114 may transmit stubs, which when invoked on the device targeted to receive the file would cause the executable code to be executed on a first device receiving incoming content segments.

Figure 3:
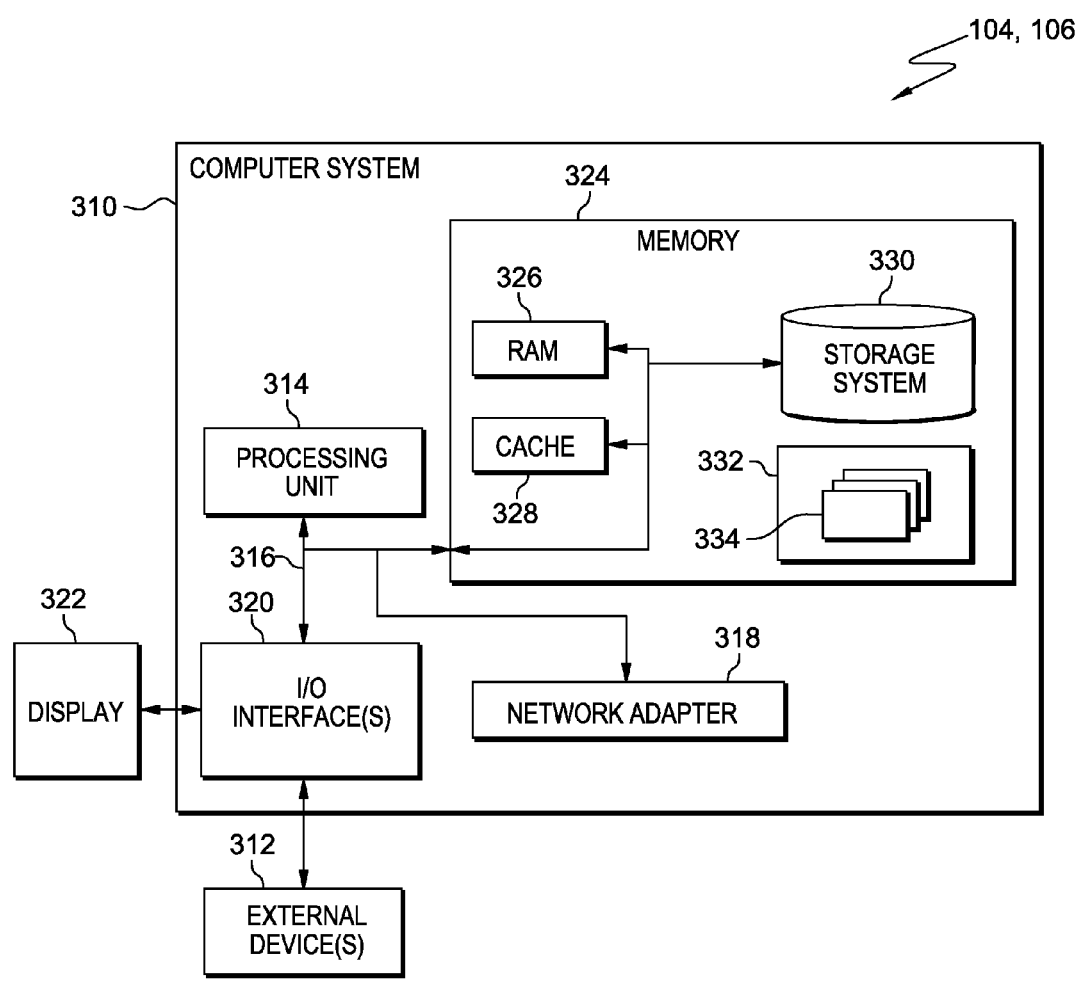
FIG. 3 is a block diagram depicting components of a data processing system (such as server 104 or client computer 106 of FIG. 1), in accordance with an embodiment of the present invention.

FIG. 3 depicts a block diagram of components of data processing environment 100, such as server 104 and client computer 106, in accordance with an illustrative embodiment of the present invention. It should be appreciated that FIG. 3 provides only an illustration of one implementation and does not imply any limitations with regard to the environments in that different embodiments may be implemented. Many modifications to the depicted environment may be made.

In the illustrative embodiment, server 104 and client computer 106 in data processing system 100 are shown in the form of a general-purpose computing device. The components of computer system 310 may include, but are not limited to, one or more processors or processing units 314, a system memory 324, and a bus 316 that couples various system components including system memory 324 to processor 314.

Bus 316 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system 310 typically includes a variety of computer system readable media. Such media may be any available media that is accessible by computer system 310, and it includes both volatile and non-volatile media, removable and non-removable media.

System memory 324 can include computer system readable media in the form of volatile memory, such as random access memory (RAM) 326 and/or cache memory 328. Computer system 310 may further include other removable/non-removable, volatile/non-volatile computer system storage media. By way of example only, storage system 330 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 316 by one or more data media interfaces. As will be further depicted and described below, system memory 324 may include at least one computer program product having a set (e.g., at least one) of program modules that are configured to carry out the functions of embodiments of the invention.

Program/utility 332, having one or more sets of program modules 334, may be stored in memory 324 by way of example, and not limitation, as well as an operating system, one or more application programs, other program modules, and program data. Each of the operating systems, one or more application programs, other program modules, and program data, or some combination thereof, may include an implementation of a networking environment. Program modules 334 generally carry out the functions and/or methodologies of embodiments of the invention as described herein. Computer system 310 may also communicate with one or more external devices 312 such as a keyboard, a pointing device, a display 322, etc., or one or more devices that enable a user to interact with computer system 310 and any devices (e.g., network card, modem, etc.) that enable computer system 310 to communicate with one or more other computing devices. Such communication can occur via Input/Output (I/O) interfaces 320. Still yet, computer system 310 can communicate with one or more networks such as a local area network (LAN), a general wide area network (WAN), and/or a public network (e.g., the Internet) via network adapter 318. As depicted, network adapter 318 communicates with the other components of computer system 310 via bus 316. It should be understood that although not shown, other hardware and software components, such as microcode, device drivers, redundant processing units, external disk drive arrays, RAID systems, tape drives, and data archival storage systems may be used in conjunction with computer system 310.

The flowcharts and block diagrams in the figures illustrate the architecture, functionality, and operation of possible implementations of methods and systems according to various embodiments of the present invention. In this regard, each block in the flowcharts or block diagrams may represent a module, segment, or portion of code, which comprises one or more executable instructions for implementing the specified logical functions. It should be noted that, in some alternative implementations, the functions noted in the blocks may occur out of the order noted in the figures. For example, two blocks shown in succession may, in fact, be executed substantially concurrently, or the blocks may sometimes be executed in the reverse order, or the blocks may sometimes be executed any number of steps prior to, or subsequent to, their current place in the order, depending on the functionality involved.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a," "an," and "the" are intended to include the plural forms as well, unless the context clearly indicates otherwise.

The description of the present invention has been presented for purposes of illustration and description, but is not intended to be exhaustive or limited to the invention in the form disclosed. Many modifications and variations will be apparent to persons of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for improving content handling and consumption by retargeting content from a web page to one or more devices, the method comprising:
issuing, by one or more computer processors, a request to configure preferences for retargeting content from the web page;
receiving, by one or more computer processors, a file from a first device;
determining at least one additional device to receive the file;
associating one or more of at least one characteristics associated to the file to the at least one additional device;
ranking the at least one additional device in a ranked hierarchy among a plurality of additional device;
applying one or more environmental factors to establish the at least one additional device as a preferred device;
associating one or more specific augmentations to the at least one additional device;
determining, by one or more computer processors, the at least one characteristic of the file;
matching, by one or more computer processors, the at least one characteristic of the file to the at least one additional device; and
outputting, by one or more computer processors, the file to the at least one additional device.

2. The method of claim 1,
wherein the at least one characteristic includes one or more of: a file type, a file size, a resolution, a playback duration, a bit rate, a codec requirement, a digital rights management requirement, a defined semantic tag, a defined query method, a defined keyword, a file location, and a defined rendering tag.

3. The method of claim 1, wherein determining at least one characteristic of the file, further comprises decomposing a plurality of information contained in the file to isolate at least one characteristic in the file.

4. The method of claim 1, wherein matching at least one characteristic previously determined in the file to an additional device, further comprises determining a common characteristic shared between the file and the at least one additional device.

5. The method of claim 4, wherein determining a common characteristic shared between the file and the at least one additional device, further comprising one or more of:
searching for an additional device in a plurality of devices that shares at least one characteristic in common with the at least one characteristic of the file;
targeting the at least one additional device that shares at least one characteristic in common with the at least one characteristic of the file; and
determining a preferred device from among the plurality of devices, based, at least in part on, configurable preferences.

6. The method of claim 1 further comprises determining, by one or more computer processors, one or more specific augmentations associated with the at least one additional device to receive the file,
wherein determining one or more specific augmentations associated with the at least one additional device to receive the file, further comprises locating one or more specific augmentations associated with the at least one additional device, wherein locating one or more specific augmentations includes referencing configurable preferences for at least one specific augmentation associated with the at least one additional device.

7. The method of claim 6, further comprises performing the one or more specific augmentations associated with the at least one additional device, wherein performing the one or more specific augmentations is based, at least in part on, augmentation instructions associated with the one or more specific augmentations.

8. The method of claim 1, wherein outputting the file to the at least one additional device, further comprising:
removing the file sharing at least one characteristic with the at least one additional device from incoming content on the first device; and
outputting the file directly to the at least one additional device.

9. A computer program product for improving content handling and consumption by retargeting content from a web page to one or more devices, the computer program product comprising:
one or more computer readable hardware storage device and program instructions stored on the one or more computer readable hardware storage device, the program instructions comprising
program instructions to issue, by one or more computer processors, a request to configure preferences for retargeting content from the web page;

program instructions to receive, by one or more computer processors, a file from a first device;

program instructions to determine at least one additional device to receive the file;

program instructions to associate one or more of at least one characteristic associated to the file to the at least one additional device;

program instructions to rank the at least one additional device in a ranked hierarchy among a plurality of additional device;

program instructions to apply one or more environmental factors to establish the at least one additional device as a preferred device;

program instructions to associate one or more specific augmentations to the at least one additional device;

program instructions to determine, by one or more computer processors, at least one characteristic of the file;

program instructions to match, by one or more computer processors, the at least one characteristic of the file to the at least one additional device; and program instructions to output, by one or more computer processors, the file to the at least one additional device.

10. The computer program product of claim 9, wherein the at least one characteristic includes one or more of: a file type, a file size, a resolution, a playback duration, a bit rate, a codec requirement, a digital rights management requirement, a defined semantic tag, a defined query method, a defined keyword, a file location, and a defined rendering tag.

11. The computer program product of claim 9, wherein program instructions to determine at least one characteristic of the file, further comprising program instructions to decompose a plurality of information contained in the file to isolate at least one characteristic in the file.

12. The computer program product of claim 9, wherein program instructions to match at least one characteristic previously determined in the file to the at least one additional device, further comprising program instructions to determine a common characteristic shared between the file and the at least one additional device.

13. The computer program product of claim 12, wherein program instructions to determine a common characteristic shared between the file and the at least one additional device, further comprising one or more of:

program instructions to search for the at least one additional device in a plurality of devices that shares at least one characteristic in common with the at least one characteristic of the file;

program instructions to target the at least one additional device that shares at least one characteristic in common with the at least one characteristic of the file; and program instructions to determine a preferred device from among the plurality of devices, based, at least in part on, configurable preferences.

14. The computer program product of claim 9 further comprises program instructions to determine, by one or more computer processors, one or more specific augmentations associated with the at least one additional device to receive the file, wherein program instructions to determine one or more specific augmentations associated with the at least one additional device to receive the file, further comprises program instructions to locate one or more specific augmentations associated with the at least one additional device, wherein locating one or more specific augmentations includes referencing configurable preferences for at least one specific augmentation associated with the at least one additional device.

15. The computer program product of claim 14, further comprises program instructions to perform the one or more specific augmentations associated with the at least one additional device, wherein performing the one or more specific augmentations is based, at least in part on, augmentation instructions associated with the one or more specific augmentations.

16. The computer program product of claim 9, wherein program instructions to output the file to the at least one additional device, further comprising:

program instructions to remove the file sharing at least one characteristic with the at least one additional device from incoming content on the first device; and program instructions to output the file directly to the at least one additional device.

17. A computer system for improving content handling and consumption by retargeting content from a web page to one or more devices, the computer system comprising: one or more computer processors;

one or more computer readable hardware storage device;

program instructions stored on at least one of the one or more computer readable hardware storage device for execution by at least one of the one or more computer processors, the program instructions comprising:

program instructions to issue, by one or more computer processors, a request to configure preferences for retargeting content from the web page;

program instructions to receive, by one or more computer processors, a file from a first device;

program instructions to determine at least one additional device to receive the file;

program instructions to associate one or more of at least one characteristic associated to the file to the at least one additional device;

program instructions to rank the at least one additional device in a ranked hierarchy among a plurality of additional device;

program instructions to apply one or more environmental factors to establish the at least one additional device as a preferred device;

program instructions to associate one or more specific augmentations to the at least one additional device;

program instructions to determine, by one or more computer processors, at least one characteristic of the file;

program instructions to match, by one or more computer processors, the at least one characteristic of the file to the at least one additional device; and program instructions to output, by one or more computer processors, the file to the at least one additional device.

18. The computer system of claim 17 further comprises program instructions to determine, by one or more computer processors, one or more specific augmentations associated with the at least one additional device to receive the file, wherein program instructions to determine one or more specific augmentations associated with the at least one additional device to receive the file, further comprises program instructions to locate one or more specific augmentations associated with the at least one additional device, wherein locating one or more specific augmentations includes referencing configurable preferences for at least one specific augmentation associated with the at least one additional device.

* * * * *